3,573,951
PREPARATION OF SYNTHETIC FILM MATERIALS
Terence Arnold Abbott, Basil R. Shephard, David Rankine Kennedy, and Margaret Loudon Clachan, Brantham, Manningtree, Essex, England, assignors to Bexford Limited, Brantham, Manningtree, Essex, England
No Drawing. Continuation-in-part of application Ser. No. 511,980, Dec. 6, 1965, now Patent No. 3,506,445. This application Sept. 22, 1966, Ser. No. 581,182
Claims priority, application Great Britain, Dec. 9, 1964, 50,118/64
The portion of the term of the patent subsequent to Apr. 14, 1987, has been disclaimed
Int. Cl. G03c 1/80; B29d 7/24
U.S. Cl. 117—7
2 Claims

ABSTRACT OF THE DISCLOSURE

A process for producing film base material consisting of biaxially orientated and heatset polyethylene terephthalate having a superimposed layer consisting of homopolymers of vinyl halogenoacetate and vinyl cyanocaetate or copolymers thereof with unsaturated carboxylic acids, vinyl acetate or vinyl alcohol wherein the superimposed layer may be applied before or after orientation.

This application is a continuation-in-part of our U.S. application Ser. No. 511,980 filed on Dec. 6, 1965, entitled "Synthetic Film Materials," now Pat. No. 3,506,445.

This invention relates to synthetic film materials, and more particularly to film base materials of use in the production of photographic materials.

It is known that self-supporting films formed of synthetic linear hydrophobic materials, particularly of the polyesters formed by reaction of ethylene glycol and terephthalic acid, and synthetic polycarbonates, may be prepared with mechanical and physical and chemical properties which, for example, render them very suitable indeed as base materials on which may be coated silver halide photographic emulsion layers for the production of photographic film materials.

However, since such base materials are inherently highly hydrophobic and the usual gelatino silver halide emulsions are highly hydrophilic, there is great difficulty in securing adequate anchorage between the base film and the emulsion layer, especially bearing in mind that the anchorage must remain firm throughout the processing sequence of the final photographic film.

It is known to deal with such a difficulty by the provision of an anchoring layer or layers (so-called "subbing" layers) between the film base and the emulsion layer, and it is an object of the present invention to provide a new method of subbing synthetic linear polyester and polycarbonate film base to render it adapted to accept, and hold strongly adherent to it, a layer of a more hydrophilic nature, e.g. one having a basis of gelatin, such as a gelatino silver halide emulsion layer.

According to a first feature of the present invention there is provided a film base material consisting of a film of synthetic linear polyester or polycarbonate of highly hydrophobic character having superimposed thereon a layer adherent to said film, hereinafter referred to as layer A, which consists predominantly of a polyvinyl halogenoester, or a polyvinyl-cyanoester, or a copolymer of a vinyl-halogenoester or a vinyl-cyanoester with an alpha-beta unsaturated carboxylic acid or with vinyl acetate and/or vinyl alcohol.

The preferred polyvinyl-halogeno-esters for use in layer A are homopolymers of vinyl mono-, di- or tri-halogeno acetate, especially vinyl mono-, di- or tri-chloroacetate, and polyvinyl monocyanoacetate.

The preferred copolymers for use in layer A are copolymers of vinyl mono-, di- or tri-halogeno-acetate, especially vinyl mono-, di- or tri-chloroacetate or vinylmono-cyano-acetate with 1 to 60 mole percent of an alpha-beta unsaturated carboxylic acid such as crotonic acid, or with 1 to 60 mole percent of vinylacetate and/or vinyl alcohol.

The homo-polymers of the class defined above may be readily prepared by polymerisation of vinyl mono-, di- or tri-halogeno-acetate or vinylmono-cyano-acetate monomer, or alternatively by the complete halogeno-acetylation or cyano-acetylation of polyvinyl alcohol. The copolymers with alpha-beta unsaturated carboxylic acids may be prepared by copolymerisation of vinyl mono-, di- or tri-halogeno acetate or vinyl mono-cyano-acetate monomer with an alpha-beta unsaturated carboxylic acid. The copolymers with vinyl acetate and/or vinyl alcohol may be prepared by copolymerisation of vinyl mono-, di- or tri-halogeno acetate or vinyl mono-cyano-acetate with vinyl acetate optionally with subsequent partial hydrolysis to introduce free hydroxyl groups; alternatively these copolymers may be prepared by direct halogeno-acetylation or cyano-acetylation of suitable starting materials such as commercial polyvinyl acetates or polyvinyl alcohols.

A valuable property of the copolymers as defined for layer A is their ability to be readily cross-linked so that the effect of solvents and temperature on the final products is minimal. Suitable cross-linking agents include tetra-alkoxy titanium compounds, tetra-alkoxy zirconium compounds, formaldehyde liberators such as paraformaldehyde, dimethylol urea and hexa-methoxymethyl melamine, and di-isocyanates and di-anhydrides. These cross-linking agents may be added in amounts up to 20% by the weight of the copolymer.

The preferred cross-linking agents for use in the invention are tetra-isopropyl-titanate and hexa-methoxy methyl melamine.

A film base material as defined above will accept with good anchorage a more hydrophilic layer such as a layer of gelatin applied from organic solvent dispersion, hereinafter referred to as layer $B_1$, or alternatively gelatin together with one of the copolymers of the type defined above as being used in layer A, applied from organic solvent dispersion, hereinafter referred to as layer $B_2$, or alternatively gelatin together with a polyvinyl acetate applied from organic solvent dispersion, hereinafter referred to as layer $B_3$.

Copolymers within the class defined which are particularly suitable for inclusion together with gelatin to form layer $B_2$ are those which have 30–60 mole percent of structural units derived from an alpha-beta unsaturated carboxylic acid, or 30 to 60 mole percent of structural units derived from vinyl acetate and/or vinyl alcohol.

The copolymers of the defined class when used in layer $B_2$ can be cross-linked in the same way as when they are used in layer A.

Suitable polyvinyl acetates for use in layer $B_3$ are readily available commercially under the Trademark Mowolith.

A film base material as defined above in which layer A is supercoated with a layer $B_1$, $B_2$ or $B_3$ is particularly adapted to accept and hold adherent to its aqueous based gelatin compositions such as a gelatino-silver-halide emulsion layer. This resultant product is of use as photographic material.

In a further embodiment of the invention in order to obtain the greatest adhesion of an aqueous based gelatine composition to a hydrophic base material which is coated with a layer A and with a layer $B_1$, $B_2$ or $B_3$ it is preferred that layer A consists predominately of a copolymer, within the class defined which has from 10 to 30 mole percent of structural units derived from an alpha-beta unsaturated carboxylic acid or from 10 to 30 mole percent of structural units derived from vinyl acetate and/or vinyl alcohol.

In another embodiment of the invention a film base material as defined above will accept with good anchorage on to the surface of layer A a cellulose acetate layer. This cellulose acetate layer may afterwards be hydrolysed on its outer surface and impregnated with a light sensitive diazonium salt or may be directly impregnated with a light sensitive diazonium salt contained in an attacking solvent medium, to produce a diazotype film material.

In a further embodiment of the invention a film base material as defined above will accept with good anchorage onto the surface of layer A a layer of polyvinyl acetal which may be directly impregnated by a light sensitive diazonium salt, contained in an attacking solvent medium, to produce a diazotype film material.

In a still further embodiment of the invention a film base material as defined above will accept with good anchorage on to the surface of layer A a layer of partially hydrolysed polyvinyl acetate which includes a light sensitive diazonium salt or which is subsequently impregnated with such a salt.

In another preferred embodiment of the invention where the film base is a film of a synthetic linear polyester, in order to assist in keying layer A to the hydrophobic film material the said base material is treated with a substance or mixture of substances having a swelling or solvent action on the base. Any of the known swelling agents or solvents for synthetic linear polyester may be used including chloro-substituted aliphatic acids such as trichloroacetic acid, phenols, chloro-substituted phenols such as mono-, di-, and tri-chlorphenol, and aromatic alcohols. These swelling agents or solvents may be conveniently applied to the base in the form of solutions and the base then heated for a short time at an elevated temperature to remove the solvent media and accelerate the action of the swelling agent on the base.

Alternatively to assist in keying layer A, to synthetic linear polyester base, substances or mixtures of substances having a swelling or solvent action on the base may be included as minor proportions of the solvent media for layer A.

Where it is desired that the final film base products are to be coloured or tinted, dyes or pigments may be included, dissolved or dispersed in any of the layers described above, as appropriate to give the required colour and density. Where the base used is one of a synthetic linear polyester the dyes or pigment may alternatively be included together with the swelling agent in the preliminary treatment of the base.

The film products of this invention may be prepared by successively coating synthetic linear polyester or synthetic linear polycarbonate base with the layers as described above, each layer being dissolved or dispersed in a volatile organic solvent medium and being dried before another is applied.

Layer A may conveniently be applied from solvent media containing lower ketones such as acetone or methyl ethyle ketone, alcohols such as methyl or ethyl alcohol or chlorinated hydrocarbons such as methylene chloride and carbon tetrachloride.

In the case of the synthetic linear polycarbonate base, solvent media which have excessive swelling action on the base such as those containing high proportions of methylene chloride are to be avoided since they may cause distortion of the base. Solvent media which contain high proportions of lower ketones should similarly be avoided since they may cause crazing of the polycarbonate base.

The hydrophilic gelatin layers $B_1$, $B_2$ and $B_3$ may be applied from solvent mixtures containing lower alcohols or ketones, the ketones constituting less than 50% of the mixture to avoid excessive swelling action on the preceding layer.

In another embodiment of the invention where the film base is a film of polyethylene terephthalate polyester it is possible to coat the layer A thereon before the film of polyethylene terephthalate has been fully orientated. By fully orientated is meant the process whereby polyethylene terephthalate film is made dimensionally stable and stronger. One method of fully orinetating polyethylene terephthalate film comprises stretching the film at 80–100° C. in a longitudinal direction with a draw ratio of 2.5–4.0 while the film is restrained from shrinkage in the other linear dimension, followed by stretching the film at 80–120° C. in the transverse direction with a similar draw ratio while maintaining sufficient tension in the already drawn longitudinal direction to again avoid shrinkage. The film is finally heated at 150–250° for some 0.5–5 minutes while being restrained from shrinkage in both dimensions; the object of such heat-setting and similar annealing processes results in a film showing little or no shrinkage or re-heating to moderate temperatures on a later occasion. As alternative processes film may also be drawn transversely prior to longitudinally, or may be biaxially drawn in both dimensions simultaneously. The term orientated as used in the specification refers only to film which has been both biaxially stretched and heat set.

Layer A may be applied to extruded amorphous polyethylene terephthalate film, to uniaxially stretched film, or to biaxially stretched film but before the heat setting step. It has been found that when layer A is so applied there is often a greater adherence of the said layer A to the polyethylene terephthalate film than when layer A is applied after the polyethylene terephthalate has been fully orientated. It has also been found that the compounds which comprise layer A may be applied to the unorientated polyethylene terephthalate film as aqueous solutions or lattices and this method of coating avoids the use of costly organic solvents which have to be recovered.

Halogen-containing phenolic substances as hereinbefore described which have slight swelling action on the surfaces of polyethylene terephthalate can be applied to the polyethylene terephthalate film before it has been fully orientated and before the layer A has been coated thereon. This results in some cases in an improved adhesion of layer A to the polyethylene terephthalate film. Application of the said halogen-containing phenolic substances can be made to the polyethylene terephthalate by adding them to the coating solution of layer A. Alternatively pretreatment of polyethylene terephthalate film was be made with the said phenolic halogen-containing substances dissolved or suspended in water or dissolved in organic solvents.

In the treatment of amorphous polyethylene terephthalate with resins and/or with phenolic halogen-containing substances it is necessary to avoid crystallization of polyethylene terephthalate, which occurs readily with solvent media which have swelling or dissolving action on the amorphous film but which do not dissolve the material when it is in the crystalline state. Therefore, it is preferred that the resins of layer A and/or a phenolic substance are applied with water as the main suspending or dissolving medium, or that a solvent having lower swelling power for polyethylene terephthalate such as methanol, is used.

The following examples will serve to illustrate the invention:

In the following Examples 1–6, biaxially oriented polyester film was used.

EXAMPLE 1

Coat 1

A copolymer containing 55 mole percent vinyl monoacetate, 11 mole percent vinyl alcohol and 1 mole percent vinyl acetate—2.0 g.
Tetra isopropyl titanate—0.1 ml.
Methylene chloride—100 ml.
Dried for approximately 5 mins. at 60° C.

Coat 2

Gelatin—1.2 g.
Water—5.0 ml.
Acetic acid—1.0 ml.
Methanol—95 ml.
Seasoned for 15 mins. at 105° C.

EXAMPLE 2

Coat 1

A copolymer containing 90 mole percent vinyl monochloracetate and 10 mole percent crotonic acid—2.0 g.
Tetra isopropyl titanate—0.1 ml.
Methylene chloride—100 ml.
Dried for approximately 5 minutes at 30° C.

Coat 2

As for coat 2 in Example 1.

EXAMPLE 3

Coat 1

Polyvinyl monochloracetate—2.0 g.
Methylene chloride—100 ml.
Coating dried for 5 mins. at 30° C.

Coat 2

Gelatin—1.0 g.
Water—2.0 ml.
Salicyclic acid—0.2 g.
Methanol—50 ml.
Acetone—50 ml.
Ethyl lactate—3.0 ml.
Chromic chloride—0.001 g.
A copolymer containing 55 mole percent vinyl monochloracetate and 45 mole percent vinyl alcohol—1.0 g.
Seasoned for 15 mins. at 105° C.

EXAMPLE 4

Coat 1

Polyvinyl monochloracetate—2.0 g.
Methylene chloride—100 ml.
Coating dried for 2 mins. at 30° C.

Coat 2

A copolymer containing 55 mole percent vinyl monochloracetate and 45 mole percent vinyl alcohol—2.0 g.
Acetone—50 ml.
Methanol—50 ml.
Ethyl lactate—3.0 ml.
Dries for approximately 5 mins. at 30° C.

Coat 3

As for coat 2 in Example 1.
Seasoned for 15 mins. at 105° C.

EXAMPLE 5

Coat 1

A copolymer containing 70 mole percent vinyl monochloracetate, 29 mole percent vinyl alcohol and 1 mole percent vinyl acetate—2.0 g.
Methylene chloride—100 ml.
Trichloracetic acid—2.0 g.
Tetra isopropyl titanate—0.1 ml.
Dried for 5 mins. at 60° C.

Coat 2

As for coat 2 in Example 1.
Seasoned for 15 mins. at 105° C.

EXAMPLE 6

Coat 1

A copolymer containing 65 mole percent vinyl dichloracetate and 35 mole percent vinyl alcohol—2.0 g.
Methylene chloride—100 ml.
Dried for 2 mins. at 60° C.

Coat 2

As for coat 2 in Example 1.
Seasoned for 15 mins. at 105° C.

In the following Examples 7 to 10 the biaxially oriented polyester film was first treated with a solution containing:
Trichloracetic acid—5.0 g.
Sodium lauryl sulphate—0.25 g.
Water—100 ml.
and dried for 5 minutes at 60° C. Coatings were then applied as set out in the examples.

EXAMPLE 7

Coat 1

A copolymer containing 50 mole percent vinyl monocyanoacetate, 49 mole percent vinyl alcohol and 1 mole percent vinyl acetate—2.0 g.
Tetra isopropyl titanate—0.1 ml.
Acetone—99 ml.
Methanol—1.0 ml.
Dried for 5 minutes at 60° C.

Coat 2

As for coat 2 in Example 1.
Seasoned for 15 minutes at 105° C.

EXAMPLE 8

Coat 1

A copolymer containing 74 mole percent vinyl monobromacetate, 25 mole percent vinyl alcohol and 1 mole percent vinyl acetate—2.0 g.
Methylene chloride—100 ml.
Dried for 5 minutes at 60° C.

Coat 2

As for coat 2 in Example 1.
Seasoned for 15 minutes at 105° C.

EXAMPLE 9

Coat 1

A copolymer containing 85 mole percent vinyl monochloracetate and 15 mole percent crotonic acid—1.0 g.
Tetra-isopropyl-titanate—0.1 ml.
Methyl ethyl ketone—100 ml.
Isopropyl alcohol—1.0 ml.

Coat 2

As for coat 2 in Example 1.
Seasoned for 15 minutes at 105° C.

EXAMPLE 10

Coat 1

A copolymer containing 65 mole percent vinyl monochloracetate, 13 mole percent vinyl alcohol and 22 mole percent vinyl acetate—2.0 g.
Hexa-methoxymethyl melamine—0.1 g.
Acetone—99 ml.
Methanol—1.0 ml.
Ethyl lactatae—3.0 ml.
Dried for 2 minutes at 30° C.

Coat 2

As for coat 2 in Example 1.
Seasoned for 15 minutes at 105° C.

EXAMPLE 11

Biaxially orientated polyester film was treated with the following solution:

2,4,6-trichlorphenol—3.0 g.
2,4-dichlorphenol—2.0 g.
Methanol—100 ml.

After drying for 5 minutes at 60° C. the following coats were applied:

Coat 1

A copolymer containing 70 mole percent vinyl monochloracetate, 29 mole percent vinyl alcohol and 1 mole percent vinyl acetate—1.0 g.
Acetone—97 ml.
Ethyl lactate—3.0 ml.
Dried for 5 minutes at 60° C.

Coat 2

As for coat 2 in Example 1.
Seasoned for 15 minutes at 105° C.

EXAMPLE 12

Biaxially oriented polyester film was treated with the following solution:

2,4,6-trichlorophenol—2.5 g.
2,4-dichlorphenol—8.5 g.
Methanol—100 ml.

After drying for 5 mins. at 60° C. the following coats were applied:

Coat 1

A copolymer containing 70 mole percent vinyl monochloracetate, 29 mole percent vinyl alcohol and 1 mole percent vinyl acetate—1.0 g.
Hexamethoxymethyl melamine—0.1 g.
p-Toluene sulphonic acid—0.01 g.
Acetone—97 ml.
Ethyl lactate—3.0 ml.
Dried for 5 minutes at 60° C.

Coat 2

Gelatin—1.4 g.
Polyvinyl acetate (Mowolith)—0.1 g.
Water—5.0 ml.
Acetic acid—1.0 ml.
Methanol—94 ml.
Formaldehyde (40% solution)—0.1 ml.

EXAMPLE 13

To biaxially oriented polyester film were applied the following coats:

Coat 1

A copolymer containing 55 mole percent vinyl monochloracetate, 44 mole percent vinyl alcohol and 1 mole percent vinyl acetate—0.5 g.
2,4,6-trichlorphenol—3.5 g.
2,4-dichlorphenol—3.5 g.
Acetone—100 ml.
Dried for 2 minutes at 90° C.

Coat 2

As in Example 12 above.

EXAMPLE 14

Biaxially oriented polyester film was treated with the following solution, which included a blue dye to give a finally prepared film base of uniform blue tint.

2,4,6-trichlorphenol—1.0 g.
2,4-dichlorphenol—1.0 g.
Alizarin pure Blue Base B—0.15 g.
Methyl ethyl ketone—100 ml.

After drying for 2 minutes at 80° C., the following coats were applied:

Coat 1

A copolymer containing 70 mole percent vinyl monochloracetate, 29 mole percent vinyl alcohol and 1 mole percent vinyl acetate—1.0 g.
Hexa-methoxymethyl melamine—0.1 g.
p-Toluene sulphonic acid—0.01 g.
Methanol—1.0 ml.
Acetone—96.0 ml.
Ethyl lactate—3.0 ml.
Dried for 5 minutes at 60° C.

Coat 2

As for coat 2 in Example 1.
Seasoned for 10 minutes at 100° C.

EXAMPLE 15

In the following example polycarbonate film was coated with:

Coat 1

A copolymer containing 70 mole percent vinyl monochloracetate, 29 mole percent vinyl alcohol and 1 mole percent vinyl acetate—1.0 g.
Tetra-isopropyl titanate—0.1 ml.
Acetone—40 ml.
Methanol—60 ml.
Ethyl lactate—3.0 ml.
Dried for 2 minutes at 30° C.

Coat 2

As for coat 2 in Example 1.
Seasoned for 15 minutes at 105° C.

A photographic gelatino silver halide emulsion coating was applied directly on to the top coating of the film products of Examples 1–11 and 14 and 15. The layers were strongly adherent to one another and to the film support, so that the final photographic film could be processed without danger of separation of the layers or frilling.

EXAMPLE 16

Biaxially oriented polyester film was pretreated and a first coat applied as in Example 11.

A subsequent coating of secondary cellulose acetate was applied directly to this first coat, adhered strongly to it and was subjected to alkaline hydrolysis in a manner known per se to provide hydrolysed surface, and this was impregnated with a solution of a light sensitive diazonium compound to yield as end product a light sensitive film for diazo type printing.

EXAMPLE 17

Biaxially orientated polyester film was pretreated and a first coat applied as in Example 11.

A second coat of hydrolysed polyvinylacetate was applied directly to this first coat adhered to it. This second coat could contain a light sensitive diazonium compound or could be impregnated with a light sensitive diazonium compound to produce a diazo-type material.

EXAMPLE 18

Biaxially oriented polyester film was pretreated and a first coat applied as in Example 11.

A second coat of a polyvinyl acetal resin was applied directly to this first coat and adhered strongly to it. This second coat could be impregnated directly with a light sensitive diazonium compound contained in a solvent medium having a swelling or solvent action on the polyvinyl acetal, without loss of adhesion of the polyvinyl acetal coat to the polyester film, to produce a diazo-type material.

In the following Examples 19–30 layer A was applied to polyester terephthalate film base before the film base had been fully biaxially orientated and heat set.

EXAMPLE 19

Polyvinyl chloracetate-alcohol prepared by heating polyvinyl alcohol with chloracetic acid until 50% of the hydroxyl groups were chloracetylated was prepared as an aqueous dispersion containing 1% resin solids. Amorphous polyethylene terephthalate was coated with the dispersion and stretched three times in both linear dimensions while being heated at 100° C. After heating at 180° C.

with prevention of retraction and cooling, the film was re-coated with a dispersion of gelatine in 6% aqueous methanol containing 1% solids and dried.

The gelatine-coated film was tested for adhesion by scoring lightly with a razor blade, attaching adhesive tape and rapidly ripping off the tape. No removal of the coated layer could be obtained. The gelatine-coated film was further tested by applying a layer of gelatino-silver halide emulsion to give a completed photographic film. Excellent adhesion of the emulsion was obtained initially, during wet processing in developer, stop-baths, fixers and washers and after drying.

EXAMPLE 20

The aqueous dispersion of resin used in Example 19 was applied to polyethylene terephthalate film after uniaxial stretching by a 1:3 ratio. After drying, the film was stretched similarly in the other linear dimension and the processes completed to a gelatine-coated film as described in Example 1.

EXAMPLE 21

A resin dispersion was prepared as in Example 1 having 3% solids content of 50 mole percent polyvinylchloracetate-alcohol. The dispersion was applied to biaxially oriented polyethylene terephthalate prior to heat-setting the film at 180° C. The coated and stabilised film was recoated with gelatine as described in Example 1.

EXAMPLE 22

A latex was prepared by emulsion polymerisation using hydrogen peroxide as a catalyst of vinyl chloracetate containing 5% solids.

The latex was applied to amorphous polyethylene terephthalate film when the film was biaxially oriented, heat-set and coated with gelatine as described in Example 1.

EXAMPLE 23

Amorphous polyethylene terephthalate was pre-treated with a 1% methanol solution of parachlorophenol followed by coating with a 3% latex of polyvinyl chloracetate. Processes to a gelatin-coated product were completed as described in Example 1.

EXAMPLE 24

A latex was prepared containing 10% solids of vinylchloroacetate crotonic acid copolymer having 5 mole percent of the latter units. The latex was coated on amorphous polyethylene terephthalate which was biaxially orientated and heat-set as described.

The coated film was re-coated with a gelatine dispersion containing gelatine (1%) and vinyl chloracetate-crotonic acid copolymer (0.5%) in a 1:1 methanol:acetone mixture containing 2% water.

EXAMPLE 25

Polyvinyl chloracetate-alcohol was prepared by heating polyvinyl alcohol with chloracetic acid until 35 mole percent of the hydroxyl groups were esterified.

The resin prepared as a 1% solution in methanol was applied to amorphous polyethylene terephthalate followed by processes of biaxial stretching, heat-setting and gelatine coating as in Example 1.

EXAMPLE 26

A latex was prepared containing 5% solids of a vinyl chloracetate-2-hydroxyethylmethacrylate copolymer having 10 mole percent of the latter units. This latex was used to coat amorphous polyester as described in Example 1.

EXAMPLE 27

A latex of 6% solid content was prepared of polyvinyl chloracetate-acrylamide containing 6 mole percent acrylamide and use to coat uniaxially stretched polyethylene terephthalate as described in Example 2.

EXAMPLE 28

A latex was prepared of vinyl chloracetate-N-methylolacrylamide of 10% solids content and to 100 ml. of this latex 2 g. of a 1:1 mixture of 2:4 dichlorophenol and 2:4:6 trichlorophenol was added. The latex was used to coat biaxially stretched polyethylene terephthalate prior to heat-setting, when processes of heat-setting and gelatine coating were completed as in Example 3.

EXAMPLE 29

Polyvinyl cyanacetate-alcohol prepared by heating polyvinyl alcohol with cyanacetic acid until 45 mole percent of the hydroxyl groups were esterified was prepared as a 3% solution in methanol containing 10% acetone. To 100 ml. of this solution 2 g. of parachloro-meta-cresol was added followed by application to amorphous polyethylene terephthalate. The amorphous film was further treated as described in Example 1.

EXAMPLE 30

Polyvinyl trichloracetate-alcohol was prepared by heating polyvinyl alcohol with trichloracetic acid until 60% of the hydroxyl groups were esterified.

A 2% dispersion of this polymer in water also containing 1% parachlorophenol was applied to amorphous polyethylene terephthalate followed by processes of biaxial orientation, heat-setting and gelatine coating as described in Example 1.

We claim as our invention:

1. In a process for the production of film base material consisting of a film of biaxially oriented and heat-set polyethylene terephthalate having superimposed thereon a layer adherent to said film which consists predominantly of a polymeric substance selected from the class consisting of the homopolymers of vinyl mono-, di- and tri-halogenoacetate and vinyl cyanoacetate and the copolymers thereof with at least one copolymerizing substance selected from the class consisting of alpha-beta unsaturated carboxylic acids, vinyl acetate and vinyl alcohol, the said copolymerizing substance constituting 1 to 60 mole percent of the copolymer, the step of applying the said layer to the polyethylene terephthalate film at any state before the polyethylene terephthalate film has been fully biaxially orientated and heat-set.

2. In a process for the production of film base material consisting of a film of biaxially orientated and heat-set polyethylene terephthalate having superimposed thereon a layer adherent to said film which consists predominantly of a polymeric substance selected from the class consisting of the homopolymers of vinyl mono-, di- and trihalogenoacetate and vinyl cyanoacetate, and the copolymers thereof with at least one copolymerizing substance selected from the class consisting of alpha-beta unsaturated carboxylic acids, vinyl acetate and vinyl alcohol, the said copolymerizing substance constituting 1 to 60 mole percent of the copolymer, the step of applying the said layer to the polyethylene terephthalate film after the polyethylene terephthalate film has been fully biaxially orientated and heat-set.

References Cited

UNITED STATES PATENTS

| | | | |
|---|---|---|---|
| 1,241,738 | 10/1917 | Klatte et al. | 260—89.1 |
| 2,591,592 | 4/1952 | Harriman | 96—87 |
| 2,792,303 | 5/1957 | Sanders et al. | 96—49 |
| 3,023,101 | 2/1962 | Ossenbrunner et al. | 96—87 |
| 3,025,163 | 3/1962 | Ossenbrunner et al. | 96—87 |
| 2,627,088 | 2/1958 | Alles et al. | 96—75X |
| 2,943,937 | 7/1960 | Nadeau et al. | 96—87 |
| 2,984,569 | 5/1961 | Huys et al. | 96—87 |
| 3,447,947 | 6/1969 | Abbott et al. | 117—138.8 |
| 3,201,249 | 8/1965 | Pierce et al. | 96—84 |

(Other references on following page)

FOREIGN PATENTS

| | | | |
|---|---|---|---|
| 589,197 | 6/1947 | Great Britain | 260—89.1 |
| 732,607 | 6/1955 | Great Britain | 96—87 |
| 865,680 | 4/1961 | Great Britain | 96—75 |
| 910,038 | 11/1962 | Great Britain | 96—91 |
| 366,532 | 6/1964 | Great Britain | 117—138.8 |
| 1,003,909 | 9/1965 | Great Britain | 96—87 |
| 1,166,616 | 3/1964 | Germany | 96—87 |
| 1,361,782 | 4/1964 | France | 96—87 |

RONALD H. SMITH, Primary Examiner

U.S. Cl. X.R.

117—138.8, 161; 96—75, 87